US010126475B2

(12) United States Patent
Hasegawa

(10) Patent No.: US 10,126,475 B2
(45) Date of Patent: *Nov. 13, 2018

(54) POLARIZED LIGHT EMISSIVE DEVICE

(71) Applicant: Merck Patent GmbH, Darmstadt (DE)

(72) Inventor: Masaki Hasegawa, Kanagawa (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/129,213

(22) PCT Filed: Mar. 6, 2015

(86) PCT No.: PCT/EP2015/000510
§ 371 (c)(1),
(2) Date: Sep. 26, 2016

(87) PCT Pub. No.: WO2015/144288
PCT Pub. Date: Oct. 1, 2015

(65) Prior Publication Data
US 2017/0115439 A1  Apr. 27, 2017

(30) Foreign Application Priority Data

Mar. 26, 2014  (EP) .................................. 14001122

(51) Int. Cl.
*G02B 5/30* (2006.01)
*C09K 11/02* (2006.01)
*C09K 11/54* (2006.01)
*C09K 11/88* (2006.01)
*H05B 33/14* (2006.01)
(Continued)

(52) U.S. Cl.
CPC ............ *G02B 5/3025* (2013.01); *C09K 11/02* (2013.01); *C09K 11/025* (2013.01); *C09K 11/54* (2013.01); *C09K 11/883* (2013.01); *G02B 5/3058* (2013.01); *G02F 1/13362* (2013.01); *H05B 33/145* (2013.01); *H05B 33/20* (2013.01); *B82Y 20/00* (2013.01); *B82Y 40/00* (2013.01); *G02F 2202/36* (2013.01); *Y10S 977/762* (2013.01); *Y10S 977/892* (2013.01); *Y10S 977/95* (2013.01)

(58) Field of Classification Search
CPC ..................................................... G02B 5/3025
USPC .......... 428/1.3, 1.31, 364; 977/762, 763, 952
See application file for complete search history.

(56) References Cited

U.S. PATENT DOCUMENTS

2005/0052859 A1  3/2005  Lazarev et al.
2009/0086317 A1*  4/2009  Etori ................... G02B 5/3025
                                                               359/449
(Continued)

FOREIGN PATENT DOCUMENTS

WO  2005012788 A1  2/2005
WO  2012059931 A1  5/2012

OTHER PUBLICATIONS

International Search Report dated May 27, 2015, issued in corresponding PCT/EP2014/000510, 4 pages.

*Primary Examiner* — Matthew D Matzek
(74) *Attorney, Agent, or Firm* — Millen White Zelano and Branigan, PC; Csaba Henter

(57) ABSTRACT

The present invention relates to a polarized light emissive device comprising a plural of fluorescent semiconductor quantum rods, and to a preparation thereof. The invention further relates to a use of the polarized light emissive device in optical devices, and to an optical device comprising the polarized light emissive device.

20 Claims, 3 Drawing Sheets

(51) Int. Cl.
*H05B 33/20* (2006.01)
*G02F 1/1335* (2006.01)
*B82Y 20/00* (2011.01)
*B82Y 40/00* (2011.01)

(56) References Cited

U.S. PATENT DOCUMENTS

| | | |
|---|---|---|
| 2010/0047151 A1 | 2/2010 | Shim |
| 2014/0009902 A1* | 1/2014 | Banin ............... G02F 1/133617 362/19 |
| 2014/0063357 A1 | 3/2014 | Koba et al. |
| 2014/0293187 A1* | 10/2014 | Nam .................... G02F 1/13362 349/62 |
| 2014/0362556 A1* | 12/2014 | Cho .......................... B32B 3/30 362/19 |

* cited by examiner

POLARIZED LIGHT EMISSIVE DEVICE

FIELD OF THE INVENTION

The present invention relates to a polarized light emissive device comprising a plural of fluorescent semiconductor quantum rods, and to a preparation thereof. The invention further relates to a use of the polarized light emissive device in optical devices, and to an optical device comprising the polarized light emissive device.

BACKGROUND ART

Polarization properties of light are used in a variety of optical applications ranging from liquid-crystal displays to microscopy, metallurgy inspection and optical communications.

For example, international patent application laid-open No. WO 2012/059931A1, WO2010/089743 A1, and WO 2010/095140 A2, Tibert van der Loop, Master thesis for Master of Physical Sciences FNWI Universiteit van Amsterdam Roeterseiland Complex; Nieuwe achtergracht 166 1018WV Amsterdam, M. Bashouti et. al., "ChemPhysChem" 2006, 7, p. 102-p. 106, M. Mohannadimasoudi et. al., Optical Materials Express 3, Issue 12, p. 2045-p. 2054 (2013), Tie Wang et al., "Self-Assembled Colloidal Superparticles from Nanorods", Science 338 358 (2012).

PATENT LITERATURE

1. WO 2012/059931 A1
2. WO 2010/089743 A1
3. WO 2010/095140 A2

NON PATENT LITERATURE

4. Tibert van der Loop, Master thesis for Master of Physical Sciences FNWI Universiteit van Amsterdam Roeterseiland Complex; Nieuwe achtergracht 166 1018WV Amsterdam
5. M. Bashouti et. al., "ChemPhysChem" 2006, 7, p. 102-p. 106,
6. M. Mohannadimasoudi et. al., Optical Materials Express 3, Issue 12, p. 2045-p. 2054 (2013),
7. Tie Wang et al., "Self-Assembled Colloidal Superparticles from Nanorods", Science 338 358 (2012)

SUMMARY OF THE INVENTION

However, the inventor newly has found that there is still one or more of considerable problems for which improvement is desired, as listed below.
1. A polarized light emissive device capable to emit a polarized light with high polarization ratio is desired.
2. Simple fabrication process for preparing said polarized light emissive device comprising a plurality of inorganic fluorescent semiconductor quantum rods to reduce production cost and/or production step is needed.

The inventor aimed to solve the all aforementioned problems.

Surprisingly, the inventor has found a novel polarized light emissive device (100), comprising a substrate including a plural of grooves (110); and a plural of inorganic fluorescent semiconductor quantum rods (120) aligned on the surface of the plural of grooves of the substrate, in which the plural of inorganic fluorescent semiconductor quantum rods (120) is not a self-assembled colloidal superparticle, solves the problems 1 and 2 at the same time.

Further advantages of the present invention will become evident from the following detailed description.

In another aspect, the invention relates to use of the said polarized light emissive device (100) in an optical device.

In another aspect, the invention further relates to an optical device (130) comprising a polarized light emissive device (100), wherein said polarized emissive device (100) comprises a substrate including a plural of grooves (110); and a plural of inorganic fluorescent semiconductor quantum rods (120) aligned on the surface of the plural of grooves of the substrate, in which the plural of inorganic fluorescent semiconductor quantum rods (120) is not a self-assembled colloidal superparticle.

The present invention also provides for a method for preparing the said polarized light emissive device, wherein the method for preparing the polarized light emissive device (100) comprises the following sequential steps of:
(a) dispersing a plural of inorganic fluorescent semiconductor quantum rods into a solvent;
(b) providing the resulting solution from step (a) onto a plural of grooves; and
(c) evaporating the solvent of the coated solution to provide the polarized light emissive device (100).

LIST OF REFERENCE SIGNS IN FIG. 1

Figure 1:
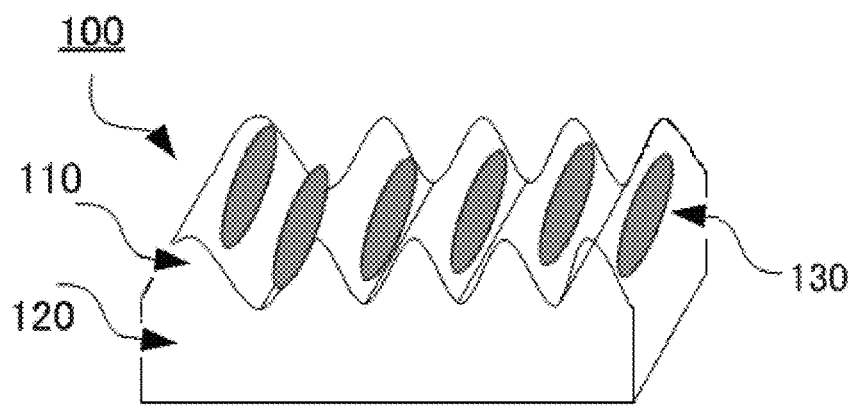
FIG. 1: Shows a cross sectional view of a schematic of a polarized light emissive device (100) with a plural of inorganic fluorescent semiconductor quantum rods (120) aligned on the surface of the plural of grooves of the substrate (110).
Figure 2:
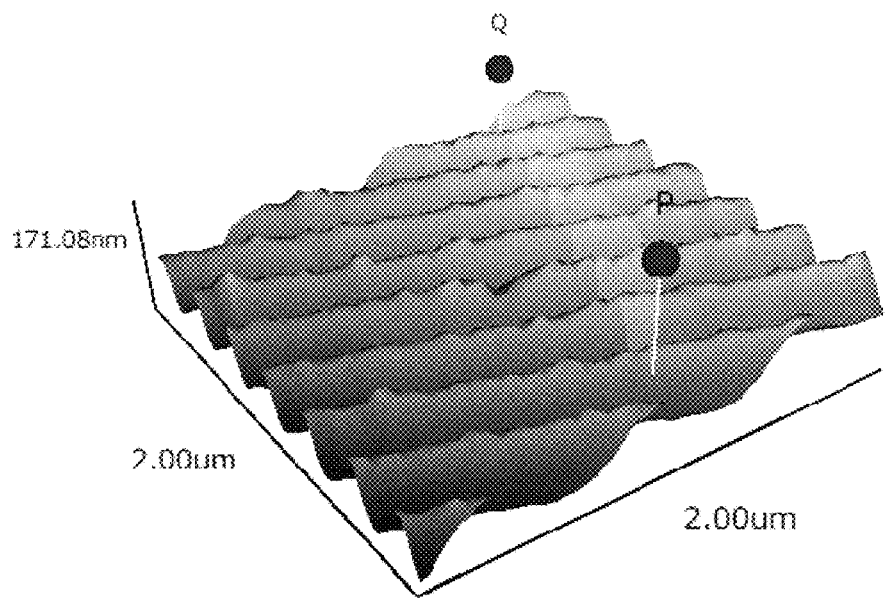
FIG. 2: Shows a perspective view of the substrate and the plural of grooves used in the working example 1.

100. a polarized light emissive device
110. a substrate
120. a plural of grooves
130. a plural of inorganic fluorescent semiconductor quantum rods Detailed Description Of The Invention In a general aspect, a polarized light emissive device (100), comprising a substrate (110) including a plural of grooves (120); and a plural of inorganic fluorescent semiconductor quantum rods (130) aligned on the surface of the plural of grooves (120) of the substrate (110), in which the plural of inorganic fluorescent semiconductor quantum rods (130) is not a self-assembled colloidal superparticle.

In general, the substrate can be flexible, semi-rigid or rigid. The material for a substrate is not particularly limited.

In a preferred embodiment of the invention, said substrate (100) and the plural of grooves (120) are transparent.

More preferably, as a transparent substrate, a transparent polymer substrate, glass substrate, thin glass substrate stacked on a transparent polymer film, transparent metal oxides (for example, oxide silicone, oxide aluminium, oxide titanium), can be used.

In some embodiments of the present invention, a transparent polymer substrate and/or polymer film can be made from polyethylene, ethylene-vinyl acetate copolymer, ethylene-vinylalcohol copolymer, polypropylene, polystyrene, polymethyl methacrylate, polyvinylchloride, polyvinylalcohol, polyvinylvutyral, nylon, polyether ether ketone, polysulfone, polyether sulfone, tetrafluoroethylene-erfluoroalkylvinyl ether copolymer, polyvinylfluoride, tetraflyoroethylene ethylene copolymer, tetrafluoroethylene hexafluoro polymer copolymer, or a combination of any of these.

In some embodiments, the polarized light emissive device (100) further comprises a light reflection layer.

In a preferred embodiment of the present invention, the light reflection layer can be placed on the plural of grooves, in between the substrate and the plural of grooves or in the substrate.

According to the present invention, the term "light reflection" means reflecting at least around 60% of incident light at a wavelength or a range of wavelength used during operation of a polarized light emissive device. Preferably, it is over 70%, more preferably, over 75%, the most preferably, it is over 80%.

More preferably, the light reflection layer is placed on the plural of grooves. A material for the light reflection layer is not particularly limited. Well known materials for a light reflection layer can be used preferably as desired.

In some embodiments, the light reflection layer can be single layer or multiple layers.

In a preferred embodiment, the light reflection layer is selected from the group consisting of Al layer, Al+MgF$_2$ stacked layers, Al+SiO stacked layers, Al+dielectric multiple layer, Au layer, dielectric multiple layer, Cr+Au stacked layers; with the light reflection layer more preferably being Al layer, Al+MgF$_2$ stacked layers or Al+SiO Stacked layers.

In general, the methods of preparing the light reflection layer can vary as desired and selected from well known techniques.

In some embodiments, the light reflection layer can be prepared by a gas phase based coating process (such as Sputtering, Chemical Vapor Deposition, vapor deposition, flash evaporation), or a liquid-based coating process.

In some embodiments of the present invention, as a preference, the plural of grooves is a plural of parallel microgrooves According to the present invention, the term "microgrooves" means microsized or nanosized grooves.

In a preferred embodiment of the present invention, the axial pitch of the plural of grooves is from 10 nm to 1.2 μm, and the height of the plural of grooves from bottom to top is from 10 nm to 1 μm. More preferably, the axial pitch is from 50 nm to 1 μm and the height is from 20 nm to 500 nm. Even more preferably, the axial pitch is from 260 nm to 420 nm and the height is from 50 nm to 100 nm.

In a preferred embodiment of the present invention, the plural of grooves (120) is placed on the surface of the substrate (110) periodically. Exemplary, the plural of grooves (120) is placed on the surface of the substrate (110) periodically and being parallel to the axis of grooves each other.

Fabrication method for the plural of microgrooves is not particularly limited. The plural of microgrooves can be fabricated as the integral part of the substrate, or can be fabricated separately and bonded onto the substrate with a transparent binder by publically known techniques. In a preferred embodiment of the present invention, a plural of microgrooves can be fabricated by laser light interference method.

Transparent materials such as transparent polymers, transparent metal oxides described above in substrate part can be used as the component of the plural of grooves preferably.

Example of laser light interference method has been described in, for example, the US patent application laid-open No. 2003/0017421.

The substrate (110) including a plural of microgrooves (120) is available, for example, from Edmund optics Co., Koyo Co., Shinetsu chemical Co. Sigma-Aldrich.

In some embodiments, the plural of inorganic fluorescent semiconductor quantum rods (130) is selected from the group consisting of II-VI, III-V, or IV-VI semiconductors and combinations of any of these.

Preferably, inorganic fluorescent semiconductor quantum rods can be selected from the groups consisting of Cds, CdSe, CdTe, ZnS, ZnSe, ZnTe, ZnO, GaAs, GaP, GaAs, GaSb, HgS, HgSe, HgSe, HgTe, InAs, InP, InSb, AlAs, AlP, AlSb, Cu$_2$S, Cu$_2$Se, CuInS$_2$, CuInSe$_2$, Cu$_2$(ZnSn)S$_4$, Cu$_2$(InGa)S$_4$, TiO$_2$ alloys and combination of any of these.

For example, for red emission use, CdSe rods, CdSe dot in CdS rod, ZnSe dot in CdS rod, CdSe/ZnS rods, InP rods, CdSe/CdS rods, ZnSe/CdS rods or combination of any of these. For green emission use, such as CdSe rods, CdSe/ZnS rods, or combination of any of these, and for blue emission use, such as ZnSe, ZnS, ZnSe/ZnS core shell rods, or combination of any of these.

Examples of inorganic fluorescent semiconductor quantum rods have been described in, for example, the international patent application laid-open No.WO2010/095140A.

In a preferred embodiment of the invention, the length of the overall structures of the inorganic fluorescent semiconductor quantum rods is from 8 nm to 500 nm. More preferably, from 10 nm to 160 nm. The overall diameter of the said inorganic fluorescent semiconductor quantum rods is in the range from 1 nm to 20 nm. More particularly, from 1 nm to 10 nm.

In some embodiments, the plural of the inorganic fluorescent semiconductor quantum rods comprises a surface ligand.

Preferably, the surface of the inorganic fluorescent semiconductor quantum rods can be over coated with one or more kinds of surface ligands.

Without wishing to be bound by theory it is believed that such a surface ligands may assist to disperse the inorganic fluorescent semiconductor quantum rods in a solvent more easily.

The surface ligands in common use include phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), Octadecylphosphonic acid (ODPA), and Hexylphosphonic acid (HPA); amines such as Dedecyl amine (DDA), Tetradecyl amine (TDA), Hexadecyl amine (HDA), and Octadecyl amine (ODA), thiols such as hexadecane thiol and hexane thiol; mercapto carboxylic acids such as mercapto propionic acid and mercaptoundecanoicacid; and a combination of any of these.

Examples of surface ligands have been described in, for example, the international patent application laid-open No. WO 2012/059931A.

In some embodiments, the polarized light emissive device (100) is illuminated by light source. Preferably, UV, near UV, or blue light source, such as UV, near UV or blue LED, CCFL, EL, OLED, xenon lamp or a combination of any of these.

In a preferred embodiment according to the present invention, the polarized light emissive device (100) embraces one or more of the light sources.

For the purpose of the present invention, the term "near UV" is taken to mean a light wavelength between 300 nm and 410 nm.

In some embodiments of the present invention, the polarized light emissive device (100) further comprises a transparent passivation layer (140). Without wishing to be bound by theory it is believed that such a transparent passivation layer may lead to an increased protection of the plural of inorganic fluorescent semiconductor quantum rods (130) aligned on the surface of the plural of grooves (120) of the polarized light emissive device (100).

Preferably, the transparent passivation layer (140) is placed on the plural of inorganic fluorescent semiconductor quantum rods (130) aligned on the surface of the plural of grooves (120) of the polarized light emissive device (100).

More preferably, the transparent passivation layer (140) fully covers the plural of inorganic fluorescent semiconductor quantum rods (130) like to encapsulate the plural of inorganic fluorescent semiconductor quantum rods in between the plural of grooves (120) and the transparent passivation layer (140).

In general, the transparent passivation layer can be flexible, semi-rigid or rigid. The transparent material for the transparent passivation layer is not particularly limited.

In a preferred embodiment, the transparent passivation layer is selected from the groups consisting of a transparent polymer, transparent metal oxide (for example, oxide silicone, oxide aluminium, oxide titanium) as described above in the transparent substrate.

In general, the methods of preparing the transparent passivation layer can vary as desired and selected from well known techniques.

In some embodiments, the transparent passivation layer can be prepared by a gas phase based coating process (such as Sputtering, Chemical Vapor Deposition, vapor deposition, flash evaporation), or a liquid-based coating process.

In another aspect, the invention relates to use of the polarized light emissive device (100) in an optical device.

In another aspect, the invention further relates to an optical device (150) comprising a polarized light emissive device (100), wherein said polarized emissive device (100) comprises a substrate (110) including a plural of grooves (120); and a plural of inorganic fluorescent semiconductor quantum rods (130) aligned on the surface of the plural of grooves of the substrate, in which a plural of inorganic fluorescent semiconductor quantum rods (130) is not a self-assembled colloidal superparticle.

In a preferred embodiment of the present invention, the optical device (150) is selected from the group consisting of a liquid crystal display, a quantum rod display, a color filter, polarized backlight unit, microscopy, metallurgy inspection and optical communications, or a combination of any of these.

More preferably, the polarized light emissive device (100) can be used as a polarized LCD backlight unit.

Examples of optical devices have been described in, for example, WO 2010/095140 A2 (quantum rod display) and WO 2012/059931 A1 (backlight unit). In another aspect, the polarized light emissive device (100) of the present invention can preferably be prepared with a liquid-based coating process.

The term "liquid-based coating process" means a process that uses a liquid-based coating composition. Here, the term "liquid-based coating composition" embraces solutions, dispersions, and suspensions.

More specifically, the liquid-based coating process can be carried out with at least one of the following processes: solution coating, ink jet printing, spin coating, dip coating, knife coating, bar coating, spray coating, roller coating, slot coating, gravure coating, flexographic printing, offset printing, relief printing, intaglio printing, or screen printing.

Therefore, the present invention further relates to a method for preparing the said polarized light emissive device (100), wherein the method comprises the following sequential steps of:
(a) dispersing a plural of inorganic fluorescent semiconductor quantum rods into a solvent;
(b) providing the resulting solution from step (a) onto a plural of groves; and
(c) evaporating the solvent of the coated solution to provide the polarized light emissive device (100).

In some embodiments of the present invention, the method further comprises the step (d) after the step (b) and before the step(c): (d) smoothing the resulting solution provided onto the plural of grooves Method to smooth the resulting solution provided onto the plural of grooves of the substrate is not particularly limited. Well known leveling methods can be used in this way preferably. Such as air blow, squeegee, blade, heating in a closed condition described in for example JP 4782863B.

In a preferred embodiment, the solvent is water or an organic solvent. The type of organic solvent is not particularly limited. More preferably, purified water or the organic solvent which is selected from the group consisting of Methanol, Ethanol, Propanol, Isopropyl Alcohol, Buthl alcohol, Dimethoxyethane, Diethyl Ether, Diisopropyl Ether, Acetic Acid, Ethyl Acetate, Acetic Anhydride, Tetrahydrofuran, Dioxane, Acetone, Ethyl Methyl Ketone, Carbon tetrachloride, Chloroform, Dichloromethane, 1.2-Dichloroethane, Benzene, Toluene, o-Xylene, Cyclohexane, Pentane, Hexane, Heptane, Acetonitrile, Nitormethane, Dimethylformamide, Triethylamine, Pyridine, Carbon Disulfide and a combination of any of these, can be used as the solvent. The most preferably, purified water or toluene.

Preferably, in step (a), dispersing is carried out with a mixer or ultrasonicator. A type of mixer or ultrasonicator is not particularly limited. In a further preferred embodiment, ultrasonicator is used in mixing, with preferably under air condition.

As a preference, in step (b), the resulting solution is coated onto the plural of grooves by the liquid-based coating process as described above to obtain a polarized light emissive device, with preferably under air condition.

In a preferred embodiment of the present invention, evaporation is carried out by exposure in air condition at room temperature, baking, vacuum or a combination of any of these.

More preferably, evaporation is carried out by baking with the condition of above 30° C. and under 200° C., even more preferably, above 50° C. and under 90° C. in air condition to obtain a polarized light emissive device, with preferably under air condition.

The working examples 1-9 below provide descriptions of the polarized light emissive device of the present invention, as well as an in detail description of their fabrication.
Definition Of Terms According to the present invention, the term "self-assembled colloidal superparticle" is taken to mean that semiconductor nanorods assemblies in the form of colloidal particles described in especially, Tibert van der Loop, Master thesis for Master of Physical Sciences FNWI Universiteit van Amsterdam Roeterseiland Complex; Nieuwe achtergracht 166 1018WV Amsterdam.

The term "transparent" means at least around 60% of incident light transmittal at the thickness used in a polarized light emissive device and at a wavelength or a range of wavelength used during operation of a polarized light emissive device.

Preferably, it is over 70%, more preferably, over 75%, the most preferably, it is over 80%.

The term "fluorescence" is defined as the physical process of light emission by a substance that has absorbed light or other electromagnetic radiation. It is a form of luminescence. In most cases, the emitted light has a longer wavelength, and therefore lower energy, than the absorbed radiation.

The term "semiconductor" means a material which has electrical conductivity to a degree between that of a conductor (such as copper) and that of an insulator (such as glass) at room temperature.

The term "inorganic" means any material not containing carbon atoms or any compound that containing carbon atoms ionically bound to other atoms such as carbon monoxide, carbon dioxide, carbonates, cyanides, cyanates, carbides, and thiocyanates.

The term "emission" means the emission of electromagnetic waves by electron transitions in atoms and molecules.

Each feature disclosed in this specification, unless stated otherwise, may be replaced by alternative features serving the same, equivalent, or similar purpose. Thus, unless stated otherwise, each feature disclosed is but one example of a generic series of equivalent or similar features.

The invention is described in more detail in reference to the following examples, which are only illustrative and do not limit the scope of the invention.

Examples

Example 1

Fabrication of Polarized Light Emissive Device with Reflective Holographic Optical Grating 0.003 g of Tri-n-octylphosphine oxide (TOPO)-covered rod-shaped nanocrystals (Qlight Technologies) were dispersed in toluene (3 g) by ultrasonication using a chip sonicator (Branson Sonifier 250).

A holographic optical grating (purchased from Edmund Optics) having 260 nm pitch and 62.4 nm height microgrooves was cleaned by sonicating in acetone.

The holographic grating consists of 5 mm glass substrate, epoxy resin with microgrooves fabricated by laser light interference, and aluminum reflector.

Then, the resulting solution was coated onto the optical grating by a drop casting method. 100 microliters of the resulting solution was dropped on the 25 mm×25 mm optical grating, and covered the whole area of the grating uniformly.

After coating of the resulting solution was then smoothed with a spatula in ambient air.

After the smoothing, the toluene in the coated solution was evaporated at 20° C. for 5 minutes in air condition.

Thus, the polarized light emissive device having reflective holographic optical grating was fabricated.

Example 2

Fabrication of Polarized Light Emissive Devices with Reflective Holographic Optical Gratings 0.003 g of Tri-n-octylphosphine oxide (TOPO)-covered rod-shaped nanocrystals (Qlight Technologies) were dispersed in toluene (3 g) by ultrasonication using a chip sonicator (Branson Sonifier 250).

A holographic optical grating (purchased from Edmund Optics) having 260 nm pitch and 62.4 nm height microgrooves was cleaned by sonicating in acetone.

The holographic grating consists of 5 mm glass substrate, epoxy resin with microgrooves fabricated by laser light interference, and aluminum reflector.

Then, the resulting solution was coated onto the optical grating by a drop casting method. 100 microliters of the resulting solution was dropped on the 25 mm×25 mm optical grating, and covered the whole area of the grating uniformly.

The toluene in the coated solution was evaporated at 20° C. for 5 minutes in air condition.

Thus, the polarized light emissive device 1 having reflective holographic optical grating was fabricated.

Polarized light emissive devices 2 having reflective holographic optical gratings were fabricated in the same manner as the device 1 described in working example 2 expect that the holographic optical gratings (purchased from Edmund Optics) having different pitch and height of microgrooves each other, 420 nm pitch with 50 nm height (device 2).

Example 3

Fabrication of a Polarized Light Emissive Device with Transmission Blazed Optical Grating 0.003 g of Tri-n-octylphosphine oxide (TOPO)-covered rod-shaped nanocrystals (Qlight Technologies) were dispersed in toluene (3 g) by ultrasonication using a chip sonicator (Branson Sonifier 250).

A glass blazed optical grating (purchased from Edmund optics) having 0.84 um pitch and 100 nm height microgrooves duplicated from mechanically ruled microgrooves was cleaned by sonicating in acetone.

Then, the resulting solution was coated onto the optical grating by a drop casting method. 100 microliters of the resulting solution was dropped on the 25 mm×25 mm optical grating, and covered the whole area of the grating uniformly.

The toluene in the coated solution was evaporated at 20° C. for 5 minutes in air condition.

Example 4

Fabrication of a Polarized Light Emissive Device with Reflective Blazed Optical Grating 0.003 g of Tri-n-octylphosphine oxide (TOPO)-covered rod-shaped nanocrystals (Qlight Technologies) were dispersed in toluene (3 g) by ultrasonication using Branson chip sonicator.

A glass blazed optical grating having 0.84 um pitch and 100 nm height microgrooves (purchased from Edmund optics) duplicated from mechanically ruled microgrooves with aluminum reflective coating was cleaned by sonicating in acetone.

Then, the resulting solution was coated onto the optical grating by a drop casting method. 100 microliters of the resulting solution was dropped on the 25 mm×25 mm optical grating, and covered the whole area of the grating uniformly.

The toluene in the coated solution was evaporated at 20° C. for 5 minutes in air condition.

Example 5

Fabrication of Polarized Light Emissive Device with PET Film Having Microgrooves 0.003 g of Tri-n-octylphosphine oxide (TOPO)-covered rod-shaped nanocrystals nanocrystals having CdSe core and CdS shell (Qlight echnologies) were dispersed in toluene (3 g) by ultrasonication using Branson chip sonicator.

An optical grating PET film having 1 um pitch and 100 nm height microgrooves (from Koyo Co.) was cleaned by sonicating in acetone.

Then, the resulting solution was coated onto the optical grating by a drop casting method. 100 microliters of the resulting solution was dropped on the 25 mm×25 mm PET film having microgrooves, and covered the whole area of the grating uniformly.

The toluene in the coated solution was evaporated at 20° C. for 5 minutes in air condition.

Example 6

Fabrication of a Polarized Light Emissive Device with Polydimethylsiloxane (PDMS) Rubber Having Microgrooves 0.003 g of polyethylenimine-covered rod-shaped nanocrystals (Qlight Technologies) were dispersed in water (3 g) by ultrasonication using Branson chip sonicator.

PDMS having 0.84 um pitch and 100 nm height microgrooves (purchased from Shinetsu Chemical Co.) duplicated from the optical grating was cleaned by sonicating in ethanol.

To duplicate the microgrooves on the optical grating, a dimethylsiloxane monomer was mixed with the initiator and poured onto the optical grating, and stayed until polymerization was done.

Then, the resulting solution was coated onto the optical grating by a drop casting method. 100 microliters of the resulting solution was dropped on the 25 mm×25 mm PDMS sheet having microgrooves, and covered the whole area of the grating uniformly.

The water in the coated solution was evaporated at 80° C. for 10 minutes in air condition.

Example 7

Fabrication of a Polarized Light Emissive Device with Polymethyl Methacrylate (PMMA) Resin Having Microgrooves 0.003 g of polyethylenimine-covered rod-shaped nanocrystals (Qlight Technologies) were dispersed in water (3 g) by ultrasonication using Branson chip sonicator.

PMMA having 0.84 um pitch and 100 nm height microgrooves (from Sigma-Aldrich) duplicated from the optical grating was cleaned by sonicating in ethanol.

To duplicate the microgrooves on the optical grating, PMMA dissolved in acetone was poured onto the optical grating, and stayed until acetone solvent was evaporated.

Then, the resulting solution was coated onto the optical grating by a drop casting method. 100 microliters of the resulting solution was dropped onto the 25 mm×25 mm PMMA sheet having microgrooves, and covered the whole area of the grating uniformly.

The water in the coated solution was evaporated at 80° C. for 10 minutes in air condition.

Example 8

Evaluation of the Polarized Light Emissive Devices

The polarized light emissive devices were evaluated by polarization microscope with spectrometer.

The devices were excited by a 1 W, 405 nm light emitting diode, and the emission from the devices were observed by a microscope with a 10× objective lens. The light from the objective lens was introduced to the spectrometer through a long pass filter; its cutoff wavelength was 420 nm and a polarizer. The objective of the long pass filter is to cut 405 nm excitation light. The light intensity of the peak emission wavelength polarized parallel and perpendicular to the microgrooves were observed by the spectrometer.

Figure 3:
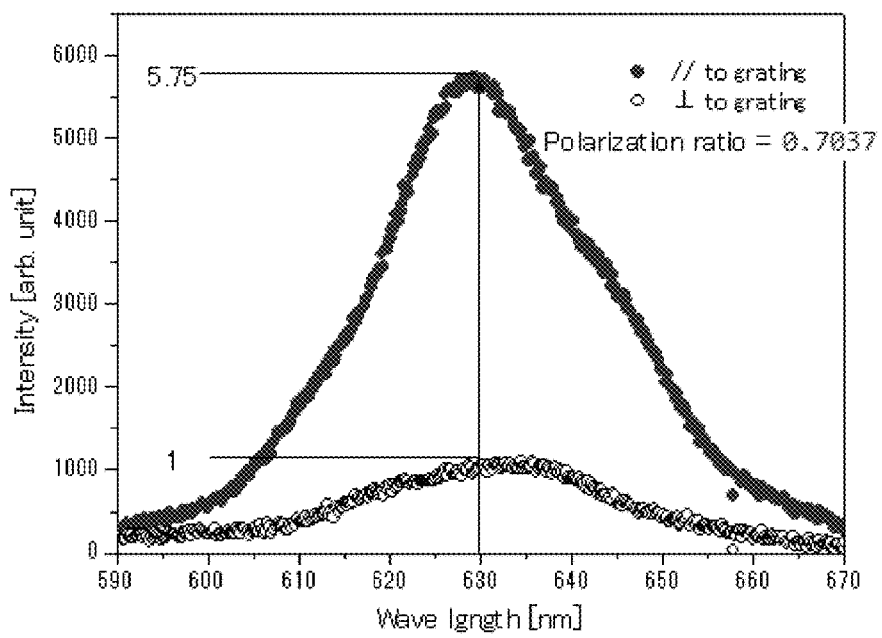
FIG. 3: Shows the device performance of the polarized light emissive device 1 fabricated in the working example 1.

Spectrum of the emission of the polarized light emissive device fabricated in the Example 1 is shown in FIG. 3.

Figure 4:
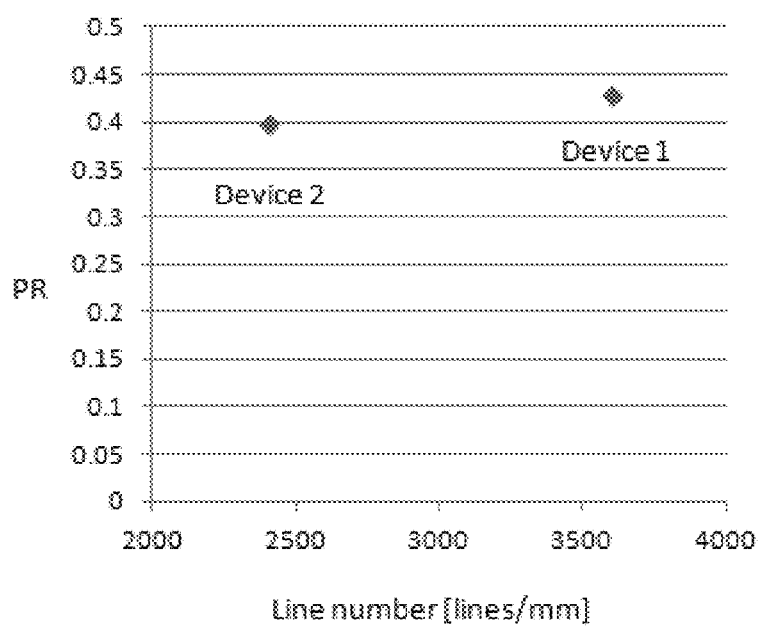
FIG. 4: Shows relations between polarization ratio (PR) and the pitch of the grating of the polarized light emissive devices 1 and 2 fabricated in the working example 2.

Polarization ratio (hereafter PR) of the emission is determined from the equation formula 1 (Eq. 1), and the relations between PR and the pitch of the grooves of the devices fabricated in working example 2 are shown in FIG. 4.

$$PR = \{(\text{Intensity of Emission})_{//} - (\text{Intensity of Emission})_{\perp}\} / \{(\text{Intensity of Emission})_{//} + (\text{Intensity of Emission})_{\perp}\} \quad \text{Equation formula 1}$$

Example 9

Fabrication of a Polarized Light Emissive Device with Reflective Holographic Optical Grating 0.003 g of Tri-n-octylphosphine oxide (TOPO)-covered rod-shaped nanocrystals (Qlight Technologies) were dispersed in toluene (3 g) by ultrasonication using a chip sonicator (Branson Sonifier 250).

A holographic optical grating (purchased from Edmund Optics) having 260 nm pitch and 62.4 nm height microgrooves was cleaned by sonicating in acetone.

The holographic grating consists of 5 mm glass substrate, epoxy resin with microgrooves fabricated by laser light interference, and aluminum reflector.

Then, the resulting solution was coated onto the optical grating by a drop casting method. 100, 80, 50, 30, and 10 microliters of the resulting solution were dropped on the 25 mm×25 mm optical grating, and covered the whole area of the grating uniformly.

The toluene in the coated solution was evaporated at 20° C. for 5 minutes in air condition.

Figure 5:
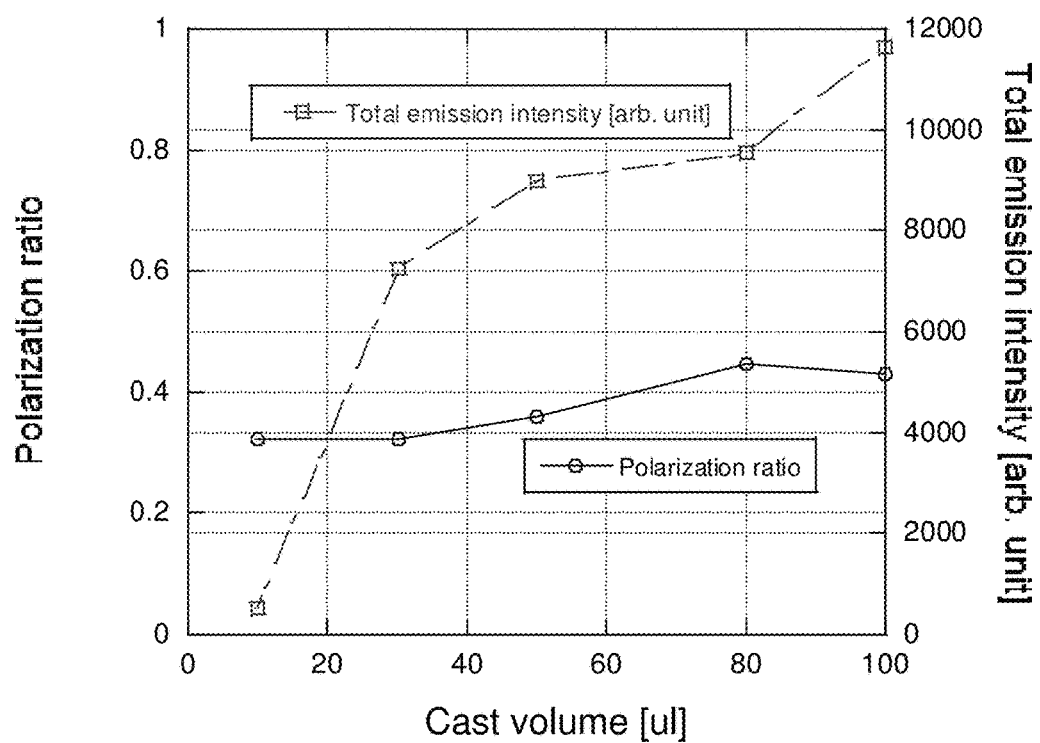
FIG. 5: Shows a relation between volumes of drop casted solution and total emission intensity of each device fabricated in working example 9, and also shows a relation between volumes of drop casted solution and polarization ratio of each device.

FIG. 5 shows a relation between volumes of drop casted solution and total emission intensity of each device fabricated in working example 9, and also shows a relation between volumes of drop casted solution and polarization ratio of each device.

The invention claimed is:

1. A polarized light emissive device (100), comprising a light reflection layer and a substrate (110) including a plural of grooves (120); and a plural of inorganic fluorescent semiconductor quantum rods (130) aligned on the surface of the plural of grooves of the substrate, in which the plural of inorganic fluorescent semiconductor quantum rods is not a self-assembled colloidal superparticle, wherein the axial pitch of the plural of grooves is from 50 nm to 1 µm and the height is from 20 nm to 500 nm.

2. The polarized light emissive device (100) according to claim 1, wherein the substrate (110) and the plural of grooves (120) are transparent.

3. The polarized light emissive device (100) according to claim 1, wherein the plural of grooves (120) is a plural of parallel microgrooves.

4. The polarized light emissive device (100) according to claim 1, wherein the plural of grooves (120) is placed on the surface of the substrate (110) periodically.

5. The polarized light emissive device (100) according to claim 1, wherein the plural of inorganic fluorescent semiconductor quantum rods (130) is selected from the group consisting of II-VI, III-V, or IV-VI semiconductors and combinations of any of these.

6. The polarized light emissive device (100) according to claim 1, wherein the plural of inorganic fluorescent semiconductor quantum rods comprises a surface ligand.

7. The polarized light emissive device (100) according to claim 1, wherein the polarized light emissive device (100) further comprising a transparent passivation layer.

8. An optical device, comprising the polarized light emissive device (100) according to claim 1.

9. An optical device, wherein the optical device includes a polarized light emissive device (100), comprising a light reflection layer and a substrate (110) including a plural of grooves (120); and a plural of inorganic fluorescent semiconductor quantum rods (130) aligned on the surface of the plural of grooves of the substrate (110), in which the plural of inorganic fluorescent semiconductor quantum rods (130) is not a self-assembled colloidal superparticle, wherein the axial pitch of the plural of grooves is from 50 nm to 1 µm and the height is from 20 nm to 500 nm.

10. A method for preparing the polarized light emissive device (100) according to claim 1, comprising the following sequential steps of:
(a) dispersing a plural of inorganic fluorescent semiconductor quantum rods into a solvent;
(b) providing the resulting solution from step (a) onto a plural of grooves; and
(c) evaporating the solvent in the coated solution to provide the polarized light emissive device (100).

11. The method for preparing the polarized light emissive device (100) according to claim 10, wherein the method further comprises the step (d) after the step (b) and before the step(c)
(d) smoothing the resulting solution provided onto the plural of grooves.

12. The method for preparing the polarized light emissive device (100) according to claim 10, wherein the solvent is water or an organic solvent.

13. The polarized light emissive device (100) according to claim 1, wherein the light reflection layer is present on the plural of grooves, in between the substrate and the plural of grooves or in the substrate.

14. The polarized light emissive device (100) according to claim 1, wherein the light reflection layer is a single layer.

15. The polarized light emissive device (100) according to claim 1, wherein the light reflection layer contains multiple layers.

16. The polarized light emissive device (100) according to claim 1, wherein the light reflection layer is selected from the group consisting of an Al layer, Al+MgF$_2$ stacked layers, Al+SiO stacked layers, Al+dielectric multiple layer, an Au layer, a dielectric multiple layer, and Cr+Au stacked layers.

17. The polarized light emissive device (100) according to claim 1, wherein the axial pitch is from 260 nm to 420 nm and the height is from 50 nm to 100 nm.

18. An optical device according to claim 9, wherein the axial pitch is from 260 nm to 420 nm and the height is from 50 nm to 100 nm.

19. An optical device according to claim 9, which is a liquid crystal display, a quantum rod display, a color filter, a polarized backlight unit, a microscope, a metallurgy inspection device or an optical communications device.

20. The polarized light emissive device (100) according to claim 1, which is a polarized LCD backlight unit.

* * * * *